(12) United States Patent
Dogariu et al.

(10) Patent No.: US 7,310,144 B1
(45) Date of Patent: Dec. 18, 2007

(54) POLARIMETRY OF THREE-DIMENSIONAL OPTICAL FIELDS

(75) Inventors: Aristide Dogariu, Winter Springs, FL (US); Jeremy Ellis, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 11/417,800

(22) Filed: May 4, 2006

Related U.S. Application Data

(60) Provisional application No. 60/692,840, filed on Jun. 22, 2005.

(51) Int. Cl.
*G01J 4/00* (2006.01)
(52) U.S. Cl. .................................................. 356/364
(58) Field of Classification Search ............... None
See application file for complete search history.

(56) References Cited

U.S. PATENT DOCUMENTS

2004/0114235 A1* 6/2004 Sedlmayr .................... 359/485

OTHER PUBLICATIONS

J. Ellis, A. Dogariu, S. Ponomarenko, and E. Wolf, "Degree of Polarization of Statistically Stationary Electromagnetic Fields", Science Direct, Optics Communications, vol. 248, pp. 333-337 (Apr. 2005).

J. Ellis and A. Dogariu, "On the degree of polarization of random electromagnetic fields", Science Direct, Optics Communications, vol. 253, (Sep. 15, 2005) pp. 257-265.

J. Ellis, and A Dogariu, "Optical Polarimetry of Random Fields," Physical Review Letters; vol. 95, The American Physical Society, Nov. 11, 2005.

J. Ellis, and Dogariu, "Correlation Matrix of a Completely Polarized, Statistically Stationary Electromagnetic Field," Optics Letters, vol. 29, No. 13, Jul. 1, 2004.

R. Dandliker, et al. "Measuring three-dimensional polarization with scanning optical probes", J. Opt. A: Pure Appl. Opt. 6, S18 (2004) abstract, [online] Journal of Optics A: Pure and Applied Optics, 1 page, [retrieved on May 4, 2006] Retrieved from: http://www.iop.org/EJ/abstract/1464-4258/6/6/003.

* cited by examiner

*Primary Examiner*—Tu T Nguyen
(74) *Attorney, Agent, or Firm*—Brian S. Steinberger; Phyllis K. Wood; Law Offices of Brian S. Steinberger, P.A.

(57) ABSTRACT

The apparatus, system and method of the present invention provide a three-dimensional polarimeter probe having a coupler for coupling three components of an electromagnetic field that fluctuates in three-dimensions and an emitter for re-emitting a radiation corresponding to said three components. The radiation includes a polarized and an unpolarized component of said electromagnetic field and is used to determine the elements of a field-field correlation martix. In an embodiment, the system includes a detector located a distance from said probe for sensing said re-emitted radiation from said probe and a processor for determining a polarized and an unpolarized component of said electromagnetic field evaluating the polarized component to produce said polarimetry of said three-dimensional optical field.

12 Claims, 2 Drawing Sheets

POLARIMETRY OF THREE-DIMENSIONAL OPTICAL FIELDS

This application claims the benefit of priority to U.S. Provisional Application No. 60/692,840 filed on Jun. 22, 2005.

FIELD OF THE INVENTION

This invention relates to optics and, in particular, to apparatus, systems and methods for characterizing the polarization properties of optical fields which fluctuate three-dimensionally by using probes which couple three components of the field, then extracting the polarized and the unpolarized components of the electromagnetic field using three-dimensional polarimetry.

BACKGROUND AND PRIOR ART

The field of optics has been dominated by the study of beam-like fields which obey the transversality condition. However, different manifestations of electromagnetic fields exist where one cannot assign a direction for the net flow of energy. Situations where the electromagnetic fields are essentially three-dimensional occur close to the surface or inside optically inhomogeneous media or in the proximity of radiation sources. Similar circumstances are at the heart of near-field optics and multi-photon microscopies.

In one way or another, all properties of light are exploited as carriers of information. Intensity and wave vectors are at the core of various imaging techniques. The spectral composition of light provides the spectroscopic information characteristic to the intricate interaction between radiation and matter. The state of polarization of optical radiation offers even more insights into phenomena such as light generation and its interaction with material systems. Unfortunately, measuring the detailed characteristics of electromagnetic fields of visible light is a formidable task because it requires discriminating about 10^15 oscillations per second. This is why light fields are usually characterized by average rather than instantaneous properties.

In general, it is considered that light whose electric field oscillates in a particular way is polarized. More specifically, an electric field is said to be polarized if and only if the field vector at a point traces an ellipse with increasing time. The situation is of course idealized; in practice, one encounters electromagnetic fields which are not perfectly harmonic but rather fluctuating quantities. This happens because light is usually generated by a large number of random atomic oscillators. Their emissions combine momentarily to form a polarized wave, but this will persist only for a very short time before different atomic oscillators emit new randomly polarized waves causing a different polarization of the resultant superposition. Consequently, the polarization of light fluctuates too rapidly to be detectable, a situation which is called random polarization. In many cases, the electromagnetic fields are neither fully polarized nor completely random or, in other words, the light is partially polarized as described in J. Ellis and A. Dogariu, "On the degree of polarization of random electromagnetic fields", Optics Communications, Vol. 253, (15 Sep. 2005) pp. 257-265, and describing these properties of electromagnetic fields constitutes the aim of polarimetry.

The polarization properties of light have been researched for more than 300 years and there is a plethora of experimental methods for determining the correlations between orthogonal components of the electric field, and from these, the conventional polarimetric parameters.

Traditionally, this was limited to beam-like fields where the electric field vector fluctuates in a plane perpendicular to the direction of propagation. However, electromagnetic fields can also be three-dimensionally structured. Such field manifestations occur in the study of multiple light scattering, in the proximity of radiation sources, or in various situations pertinent to near-field optics and multiphoton microscopies. So far, determining directly the properties of three-dimensional fields was not possible and one had to rely on measurements performed far from the source and then relate these to the properties of the field of interest. While the direct problem of calculating the properties of the far-field for a given source can be straightforward, the inverse problem—which is usually of interest in practice—does not have a unique solution. Progress in solving the inverse problem can be achieved only by either making assumptions regarding the properties of the field to be determined or by performing additional measurements along different directions of propagation. Nevertheless, having direct access to the three-dimensional field would be a better option!

The complete determination of the characteristics of a three-dimensional field requires simultaneous measurements of the properties of the field in three different directions. This is realized by using three orthogonal dipole-like probes which are overlapped spatially and which are detected simultaneously. In the optical domain however, this approach cannot be implemented because an ensemble of three dipoles which can be read independently simply does not exist.

Instead of superposing three dipole-like detectors, the device, system and method of the present invention uses a probe that is placed within the three-dimensional field. The probe couples all three components of the field and then re-emits the radiation. The probe acts a secondary source for the radiation which will eventually be sensed by a conventional detector placed away from the point of measurement. The result is a linear combination of the measurements possible with three independent dipoles. In order to determine the entire polarimetric information, measurements are performed with multiple probes. Different probe designs can be implemented.

The apparatus, system and method of the present invention provide a novel approach for characterizing the polarization properties of electromagnetic fields which fluctuate three-dimensionally. The state of polarization of an optical field provides detailed information concerning both the radiation emission processes and the intricate interaction between light and matter. Using probes which couple all three components of the field, the polarized and unpolarized components of such fields are extracted to produce what could be called "three-dimensional polarimetry".

SUMMARY OF THE INVENTION

A primary objective of the present invention provides a device, system and method for determining the magnitude and the actual state of polarization of the polarized component, so that, through a direct measurement, the ordered part of a random field is isolated.

A secondary objective of the invention is to provide a new method, system, apparatus and device for use in sensing applications to retrieve the entire polarimetric information about an incoming beam without a priori knowledge of its direction.

A third objective of the invention is to provide a new method, system, apparatus and device to provide a polarimetric sensor that can be integrated to any surface shape.

A fourth objective of the invention is to provide a new method, system, apparatus and device for coupling optical radiation collected by a photonic probe into an optical fiber for remote detection of the actual intensity of the radiation.

A fifth objective of the invention is to provide a new apparatus, system and device for determining the polarization properties of electromagnetic fields which fluctuate in three-dimensions.

A sixth objective of the present invention provides three-dimensional polarimetry that is directly applicable to the fields of fluorescence and multi-photon microscopy.

A seventh objection of the present invention provides three-dimensional polarimetry for use in near field optics and nano-photonics where the properties of the optical field reveal the complex light-matter interaction.

An eighth objective of the present invention provides 3D polarimetry for direct measurement of the shapes of underlying sub-wavelength objects. The full polarimetric measurement also improves the spatial resolution of near-field scanning optical microscopy by exploiting different contrast mechanisms.

A first preferred embodiment of the invention provides an apparatus, system and method for complete determination of the characteristics of a three-dimensional field using simultaneous measurements of the properties of the field in three different directions. A probe which couples all three components of the field is placed in the field. This probe acts as a secondary source, re-emitting the radiation which is sensed by a conventional detector located a distance from the probe. The result is a linear combination of the measurements corresponding to the field. In order to determine the entire polarimetric information, measurements are performed with multiple probes.

Further objects and advantages of this invention will be apparent from the following detailed description of preferred embodiments which are illustrated schematically in the accompanying drawings.

BRIEF DESCRIPTION OF THE DRAWINGS

FIG. 2b show the measured polarized components of the random field generated by superimposing three circularly polarized laser beams as shown in FIG. 2a.

FIG. 2c show the measured unpolarized components of the random field generated by superimposing three circularly polarized laser beams as shown in FIG. 2a.

DESCRIPTION OF THE PREFERRED EMBODIMENTS

Figure 1:
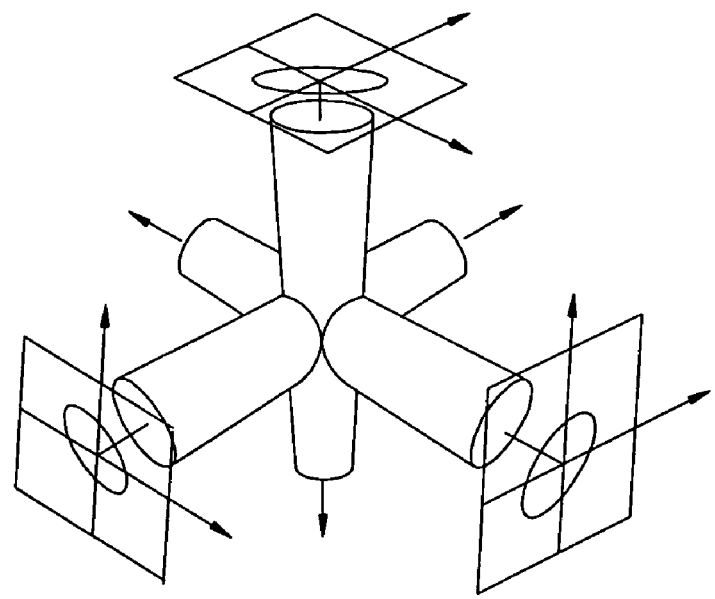
FIG. 1 shows three laser beams overlapped to produce a three dimensional filed according to the present invention.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

In principle, the complete determination of the characteristics of a three-dimensional field requires simultaneous measurements of the properties of the field in three different directions. This is realized by using, for instance, three orthogonal dipole-like probes which are overlapped spatially and which are detected simultaneously. In the optical domain however, this approach cannot be implemented because an ensemble of three dipoles which can be read independently simply does not exist. The apparatus, system and method of the present invention provides a new concept for directly measuring polarization properties of a three-dimensional field as described in terms of the second-order correlations with respect to the electric-field strength.

Instead of superposing three dipole-like detectors, a probe which couples all three components of the field and then re-emits the radiation is placed in the point of interest. The probe acts as a secondary source for the radiation which is eventually sensed by a conventional detector placed away from the point of measurement. The result is a linear combination of the measurements possible with three independent dipoles and, in order to determine the nine independent elements of the field correlation matrix, it is necessary to perform measurements with nine different probes. It is important to emphasize that, due to propagation from the probe to the final detector, the field becomes practically transversal having a net energy flow that is pointed toward the two-dimensional detector.

The entire operation of detecting the intensity $I_D$ by the two-dimensional detector can be formally written as $$I_D = tr[T^\dagger_{2\times3} \alpha^\dagger_{3\times3} W_{3\times3} \alpha_{3\times3} T_{3\times2}] \quad (1)$$

where the three-dimensional field correlations included in W are detected after being collected by the probe characterized by a 'polarizability' $\alpha$ and transferred to the detector by a linear system having a transfer function T. The indices denote the dimensionalities of the corresponding matrices. In order to perform the three-dimensional polarimetry, i.e. to determine all the elements of W, one has to repeat the measurement nine times after changing elements in either T or $\alpha$.

It is interesting to note that the 'conventional' polarimetry performed on transversal fields can be represented as $$I_D = tr[T^\dagger_{2\times2} W_{2\times2} T_{2\times2}] \quad (2)$$

where $T_{2\times2}$ is the Jones matrix of the polarimeter. In this example, four measurements are necessary to determine the elements of W and the four measurements are performed by altering elements of the two-dimensional transfer matrix T.

However, conventional polarimetric measurements performed on the radiation that has been coupled and then re-emitted by one probe are insufficient for determining the elements of the field-field correlation matrix W of a three-dimensional field. An inspection of Eq. (1) leads to the realization that modifications in the transfer function T allows four independent measurements. To achieve the task of 3D polarimetry, variations of $\alpha$ are used. This approach requires use of probes with different polarizabilities. For example, nine different probe configurations can be used to generate nine values of the detected intensity $I_D$. The linear independence provides retrieval of the elements of the field-field correlation matrix W.

According to the present invention, a field with adjustable properties is produced by overlapping three orthogonal laser beams generated by three independent laser sources as shown in FIG. 1. The states of polarization of the three laser sources are fully controllable and, therefore, in the region of beams overlap, which is of the order of one cubic millimeter, the polarization of the three-dimensional field is adjustable. FIG. 1 shows three laser beams overlapped to produce a three-dimensional field distribution. The polarization properties of the three-dimensional field are adjustable by independently controlling the characteristics of the three beams.

The field probe used in this experiment is a single mode silica fiber which is conically shaped at one end and is coupled to a photomultiplier at the other. To realize nine different probe configurations, the fact that two sharp fibers placed next to each other alter each other's coupling properties is used. Adjusting the relative positions of additional tapered fibers which are placed in the probe's proximity create nine independent probes. The polarizabilities of the nine probe configuration in this example do not need to be known apriori (i.e. nine specifically shaped probes are not required, just nine independent polarizabilities), as the coupling may be calibrated by using a set of at least nine known generated fields. Once the nine independent configurations have been realized and the calibration fulfilled, it is possible to reconstruct the second-order field correlations, such as the W matrix, of an "unknown" field.

By examining a particular situation of a field obtained by superposing three right circular beams with mutually orthogonal directions of propagation, the capability of the measurement is illustrated. Because the three beams are produced by different laser sources, the field generated by their superposition is not fully polarized. However, each laser beam provides correlated contributions to the other two directions and, therefore, a partial correlation exists between the three directions. As a result, the field in the region of overlap contains a polarized component even though the radiation is generated by independent sources.

Using a recently introduced procedure for field decomposition, the cross spectral density matrix can be decomposed as $$W = \alpha W_{pol} + \beta W_{unpol} \quad (3)$$

into a polarized and an unpolarized component. This decomposition is possible because the cross-spectral density matrix is Hermitian, and therefore diagonalizable by a unitary transformation. For details see J. Ellis, A. Dogariu, S. Ponomarenko, and E. Wolf, "Polarization of statistically stationary electromagnetic fields", Optics Communications, Vol. 248, pp. 333-337 (April 2005). The actual values of the coefficients $\alpha$ and $\beta$ are found by solving the eigenvalue problem associated with the measured W matrix. These coefficients quantify the energy density in the different components of the three-dimensional field while the corresponding eigenvectors specify the state of polarization of the polarized component.

Figure 2A:
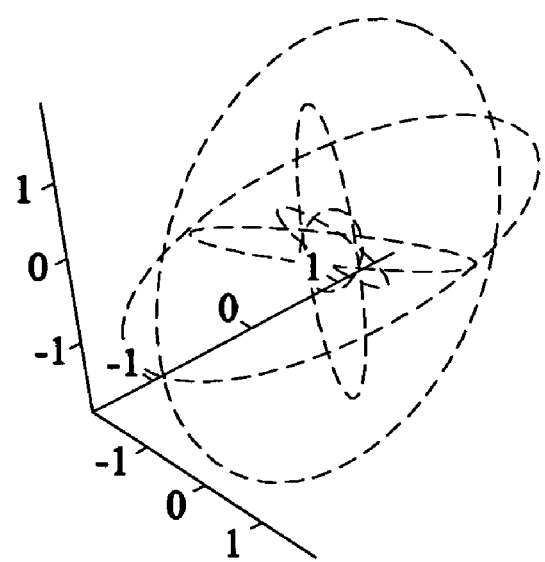
FIG. 2a show the random field generated by superimposing three circularly polarized laser beams.
Figure 2B:
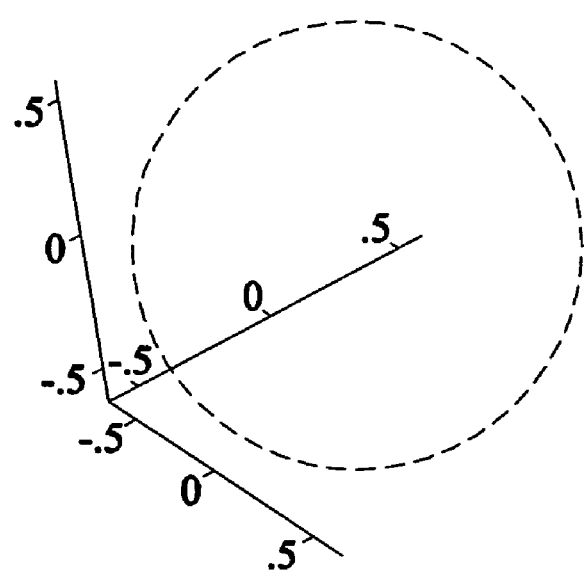
Figure 2C:
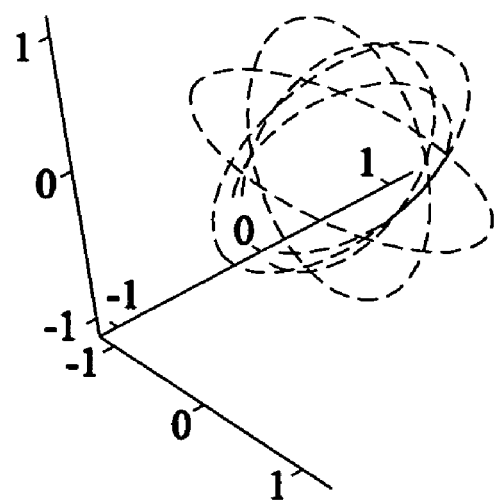

The decomposition of initial field in the two components suggested in Eq. (3) is illustrated in FIGS. 2a-c by graphing the real part of the instantaneous complex electric field vector. The random field generated by superposing the three circularly polarized laser beams is shown in FIG. 2a and the measured polarized and unpolarized components of this field are shown in FIGS. 2b and 2c, respectively. The dots represent the real part of the electric field while the continuous lines denote the trajectory followed by the electric field vector during one period of oscillation. At the time scales shown, the field is fully polarized. The ellipse is practically maintained over a time period of the order of the coherence time after which the polarization ellipse and its orientation in space change. When the measurement is performed over long enough time periods, the average over an ensemble of such randomly polarized component states, is recorded. The measured field and its polarized component are in complete agreement with the expected field and the decomposition of Eq. (3). The results shown in FIG. 2 demonstrate that, even though the field fluctuates in all three directions, one can uniquely isolate the polarized component, that is, the portion of the electric field which, over the entire time of the measurement, oscillates on a fixed ellipse. By determining both the magnitude and the actual state of polarization of the polarized component means that, through a direct measurement, the ordered part of a random field is isolated.

When optical phenomena are discussed in the context of second-order statistics, the full characterization of random electric fields requires knowledge about the nine possible correlations between field components. If a random field has a polarized component, then that component is confined to a plane. As time evolves, the field vector associated with that component describes an ellipse in that plane. Using the apparatus, system and method of the present invention, a direct measurement determines the polarized and unpolarized components of a three-dimensional random field. The measurement procedure using the 3D polarimeter of the present invention provides the ability to isolate and uniquely identify the polarized component and its corresponding plane. In an embodiment, other field descriptions, such as the degree of polarization which measures the ratio between the intensity of the polarized component and the total intensity of the total field, are subsequently evaluated. Different probe designs can be implemented.

There are many practical situations that could benefit from understanding the polarization properties of electromagnetic fields which fluctuate in three-dimensions. It is not practical to list all possible applications of three-dimensional polarimetry and its underlying formalism; however, a number of them are worth noting. As the characteristics of a fluctuating field are directly influenced by the properties of the sources that give rise to that field, the direct measurement of the field itself provides greater insight into the underlying source of radiation. It is expected that the ordered portion of a measured three-dimensional field, the polarized local density of states, relates to both bulk structural and morphological properties of the sources. In this context, three-dimensional polarimetry is directly applicable to the fields of fluorescence and multi-photon microscopy. For instance, fluorescence measurements performed in the far-field provide limited information about the structural and dynamical properties of the fluorophore centers. Determining the field inside the emission volume, offers a greater level of detail regarding the structural and dynamic properties of the fluorophores. Also, because the measurement technique of the present invention uniquely identifies and fully describes the polarized component, use of such a 3D polarimeter provides improvement of imaging objects imbedded in dense scattering media.

Another notable application is in near field optics and nano-photonics where the properties of the optical field reveal the complex light-matter interaction as described in M. Ohtsu and K. Kobayashi, Optical near fields, Springer-Verlag, Berlin (2004). It has been shown that near-field measurements are usually subject to the transverse component of the electric field as described in R. Dandliker, et al. "Measuring three-dimensional polarization with scanning optical probes", J. Opt. A: Pure Appl. Opt. 6, S18 (2004). Furthermore, the shape information of sub-wavelength structures depends greatly on the incident field and is encoded in the full three-dimensional scattered field. The 3D polarimetry could therefore provide a direct measurement of the shapes of underlying sub-wavelength objects without the need for additional assumptions. The full polarimetric measurement suggested here should also improve the spatial resolution of near-field scanning optical microscopy by exploiting different contrast mechanisms.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A three-dimensional polarimeter probe comprising:
   a coupler for coupling three components of an electromagnetic field that fluctuates in three-dimensions, the coupler comprising:
   a first, second and third laser source for producing a first, second and third orthogonal laser beams, said first, second and third orthogonal laser beams overlapping to produce the field with adjustable properties; and
   a controller for controlling a state of polarization of the first, second and third laser sources, wherein in the region of beam overlap the polarization of a three-dimensional field is adjustable and contains a polarized component; and
   an emitter for re-emitting a radiation corresponding to said three components, wherein said radiation includes a polarized and an unpolarized component of said electromagnetic field to determine elements of a field-field correlation matrix.

2. A system for the polarimetry of a three-dimensional optical field comprising:
   a probe for coupling a radiation of an electromagnetic field that fluctuates in three dimensions and re-emitting said radiation, said probe having adjustable field coupling properties;
   a detector located a distance from said probe for sensing said re-emitted radiation from said probe; and
   a processor for executing a set of instructions to produce a polarimetry of said three-dimensional optical field, said set of instructions comprising:
   a first subset of instructions for determining a polarized and an unpolarized component of said electromagnetic field; and
   a second subset of instructions for evaluating said polarized component to produce said polarimetry of said three-dimensional optical field.

3. The system of claim 2, wherein said probe comprises:
   three laser sources for producing three orthogonal laser beams, said three orthogonal laser beams overlapping to produce the field with adjustable properties; and
   a controller for controlling a state of polarization of the three laser sources, wherein in the region of beam overlap the polarization of a three-dimensional field is adjustable and contains a polarized component.

4. The system of claim 2, further comprising:
   a third subset of instructions analyzing said polarized component to determine a magnitude, a degree of polarization and a plane corresponding to said polarized component.

5. The system of claim 4, further comprising:
   a fourth set of instructions for isolating an ordered part of a random field using the magnitude, a degree of polarization and a plane corresponding to said polarized component.

6. A method for measuring polarization properties of a three-dimensional field comprising the steps of:
   coupling a radiation of an electromagnetic field fluctuating in a three-dimensional field with a polarimetric sensor, the coupling including the steps of:
   generating at least two orthogonal laser beams by at least two independent laser sources;
   overlapping the at least two orthogonal laser beams to generate an adjustable three-dimensional field having a polarized component; and
   using the adjustable three dimensional field by the polarimetric sensor to determine elements of a field-field correlation matrix;
   re-emitting said radiation from said polarimetric sensor;
   sensing said re-emitted radiation from said polarimetric sensor at a detector located a distance from said polarimetric sensor;
   recording the re-emitted radiation;
   evaluating said sensed radiation to determine a polarized and an unpolarized component of the three-dimensional field; and
   analyzing said polarized component to determine a characteristic of said three-dimensional field and produce a polarimetry of the three-dimensional field.

7. The method of claim 6, further comprising the steps of:
   adjusting a polarization of the three-dimensional field by independently controlling the characteristic of the at least two laser beams; and
   repeating the adjustment step plural times to obtain plural independent elements of a field-field correlation matrix of the three-dimensional field.

8. The method of claim 6 wherein said analyzing step comprises the step of:
   determining at least one of a magnitude and a state of polarization of said polarized component to identify said characteristic of said three-dimensional filed.

9. The method of claim 8, further comprising the step of:
   isolating an ordered part of said electromagnetic field through direct measurement with the magnitude and state of polarization of said polarized component.

10. The method of claim 6, further comprising the step of:
    integrating said polarimetric sensor to a predetermined shape for measuring the characteristic of the three-dimensional field.

11. The method of claim 6, further comprising the step of:
    imaging objects imbedded in dense scattering media.

12. The method of claim 6, further comprising the step of:
    retrieving a polarimetric of said electromagnetic field of an incoming beam without a priori knowledge of a direction of the beam.

* * * * *